United States Patent
Truong et al.

(10) Patent No.: US 11,061,845 B2
(45) Date of Patent: Jul. 13, 2021

(54) INPUT/OUTPUT HUB

(71) Applicant: HEWLETT-PACKARD DEVELOPMENT COMPANY, L.P., Houston, TX (US)

(72) Inventors: Binh T. Truong, Houston, TX (US); Nam H. Nguyen, Houston, TX (US); Pamela Estella Stratton, Houston, TX (US); Peter W. Austin, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1 day.

(21) Appl. No.: 16/076,754

(22) PCT Filed: Feb. 3, 2017

(86) PCT No.: PCT/US2017/016366
§ 371 (c)(1),
(2) Date: Aug. 9, 2018

(87) PCT Pub. No.: WO2018/144003
PCT Pub. Date: Aug. 9, 2018

(65) Prior Publication Data
US 2019/0050360 A1    Feb. 14, 2019

(51) Int. Cl.
*G06F 13/40* (2006.01)
*G06F 1/16* (2006.01)
*G06F 1/32* (2019.01)
*G06F 13/42* (2006.01)
*G07G 1/00* (2006.01)

(52) U.S. Cl.
CPC ........ *G06F 13/4027* (2013.01); *G06F 1/1632* (2013.01); *G06F 1/32* (2013.01); *G06F 13/40* (2013.01); *G06F 13/4282* (2013.01); *G07G 1/0027* (2013.01); *G06F 2213/0042* (2013.01)

(58) Field of Classification Search
CPC ........ G06Q 20/202; G06Q 20/20; G07G 1/12; G07G 1/0018; G06F 1/1632; G06F 13/385; G06F 2213/0042; G06F 13/4282
USPC .............. 705/21, 16; 235/380; 710/300, 303
See application file for complete search history.

(56) References Cited

U.S. PATENT DOCUMENTS

| | | | |
|---|---|---|---|
| 6,701,192 B1* | 3/2004 | Herwig | G06Q 20/20 235/2 |
| 9,575,917 B1* | 2/2017 | Zhu | G06F 13/385 |
| 10,483,681 B1* | 11/2019 | Du | G06F 3/0661 |
| 2009/0076921 A1* | 3/2009 | Nelson | G06Q 20/20 705/16 |

(Continued)

FOREIGN PATENT DOCUMENTS

WO  2016167802 A1  10/2016

OTHER PUBLICATIONS

Hawley, "USB Type-C and USB 3.1 Explained", Retrieved from Internet—https://www.logicsupply.com/explore/io-hub/usb-type-c-and-usb-3-1-explained/, Apr. 21, 2016, 7 Pages.

*Primary Examiner* — Faisal M Zaman
(74) *Attorney, Agent, or Firm* — Brooks Cameron & Huebsch PLLC

(57) ABSTRACT

Example implementations relate to an input/output (I/O) hub. An example I/O hub can include a registered jack (RJ) 12 I/O retail port and a Universal Serial Bus (USB) type-C port to deliver power and communication data to the RJ12 I/O retail port.

14 Claims, 3 Drawing Sheets

(56) References Cited

U.S. PATENT DOCUMENTS

| | | | |
|---|---|---|---|
| 2011/0103004 A1* | 5/2011 | Brock | G06F 1/1632 |
| | | | 361/679.43 |
| 2013/0166400 A1* | 6/2013 | Nguyen | G07G 1/0018 |
| | | | 705/16 |
| 2013/0254050 A1* | 9/2013 | Zhu | G06Q 20/20 |
| | | | 705/20 |
| 2014/0279116 A1* | 9/2014 | Vasguez | G07G 1/0018 |
| | | | 705/21 |
| 2015/0034398 A1* | 2/2015 | Charij | G07G 1/0018 |
| | | | 177/25.13 |
| 2015/0160705 A1* | 6/2015 | Chen | H02J 1/10 |
| | | | 713/300 |
| 2015/0206165 A1* | 7/2015 | Cummins | G06Q 20/203 |
| | | | 705/14.23 |
| 2015/0324321 A1* | 11/2015 | Lin | G06F 1/266 |
| | | | 710/300 |
| 2016/0012269 A1 | 1/2016 | Kowalczyk et al. | |
| 2016/0020911 A1 | 1/2016 | Sipes et al. | |
| 2016/0173678 A1* | 6/2016 | DeCamp | G06F 1/266 |
| | | | 455/557 |
| 2016/0181850 A1* | 6/2016 | Toivola | H02J 7/025 |
| | | | 320/108 |
| 2017/0005494 A1* | 1/2017 | Li | H02J 2207/40 |
| 2017/0060209 A1* | 3/2017 | Volek | H02J 7/00 |
| 2017/0102736 A1* | 4/2017 | Peng | G06F 1/266 |
| 2017/0118002 A1* | 4/2017 | Kao | H04L 5/1461 |
| 2017/0161221 A1* | 6/2017 | Yakame | G06F 1/1632 |
| 2017/0185125 A1* | 6/2017 | Lin | G06F 1/266 |
| 2017/0220515 A1* | 8/2017 | Lin | H04L 12/40006 |
| 2017/0222457 A1* | 8/2017 | Hijazi | G06F 1/266 |
| 2017/0317583 A1* | 11/2017 | Forghani-Zadeh | |
| | | | H03K 17/04206 |
| 2017/0364463 A1* | 12/2017 | Chen | G06F 13/385 |
| 2018/0060270 A1* | 3/2018 | Schnell | G06F 13/4022 |
| 2018/0198248 A1* | 7/2018 | Sun | H01R 31/065 |
| 2018/0210744 A1* | 7/2018 | Shih | G06F 8/654 |

\* cited by examiner

INPUT/OUTPUT HUB

BACKGROUND

A hub can expand a single port into a plurality of ports. The ports can be input/output (I/O) ports, for instance. A retail hub can include a port comprising a plurality of ports used for retail devices, including for instance, point-of-service (POS) devices.

DETAILED DESCRIPTION

Universal Serial Bus (USB) hubs, also known as USB controller hubs, can be used to power USB devices. These USB hubs expand a single USB port into several USB ports, so that there are more USB ports available to connect devices to a host system. The USB port type can vary, but devices connected to the hub are all connected via a USB type connector. In such approaches, retail devices including cash drawers are connected to the hub via a USB port.

In contrast, examples of the present disclosure utilize a hub to power USB type connector devices and a non-USB type connector device, such as a registered jack (RJ) 12 device. For instance, an RJ12 device can include an RJ12 cash drawer device. RJ12 cash drawer devices may be less expensive as compared to USB or internet cash drawers used with hubs associated with other approaches. Additionally or alternatively, a hub in accordance with the presented disclosure can power retail-specific ports using USB type-C technology to convert the hub to supply power to the retail-specific ports. In some examples, a hub in accordance with the present disclosure can support data communication at a USB 3.1 speed, in contrast to other retail hub approaches that cannot. In addition, some examples of the present disclosure can allow for the use of mobile computing devices including tablets and notebooks with USB type-C interfaces to be used in a retail space.

Some hub approaches include the use of a plurality of cables to each port of a hub. For instance, a USB, Ethernet, network, or other hub can have a single cord connected to a first end, and a plurality of cords connected to a second end. In contrast, a hub in accordance with the present disclosure can reduce the amount of cable exposed to a retail environment as compared to other approaches. For instance, a USB type-C cable can reduce a diameter of running separate cables for each I/O port of a hub to one centimeter as compared to approximately three inches with other approaches.

Figure 1:
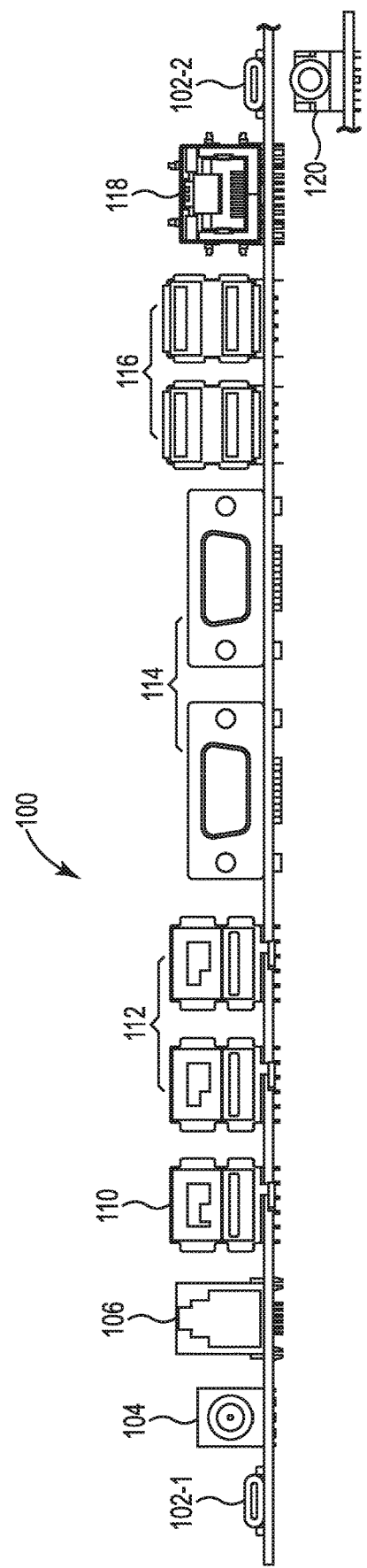
FIG. 1 illustrates a hub.

FIG. 1 illustrates a hub 100. In some examples, hub 100 can be an integrated circuit and can be a retail hub, such as a retail POS hub, that leverages USB type-C technology with retail-specific device connectors. For example, the hub can be a retail I/O hub featuring a USB type-C connector utilizing USB-power delivery (USB PD) technology as a focal bus to deliver power and communication data to retail and other ports of the hub. For instance, a microcontroller can be used to bind the USB type-C connector to a main bus. As used herein, USB PD is a single-wire protocol leveraging USB type-C standards and cables. USB PD negotiation allows devices to create a contract to deliver a highest power level for each application under the current battery conditions. This can expand USB to deliver up to 100 Watts (20V, 5 A) of power.

As used herein, USB-type C can enable reversible plug orientation and cable direction while leveraging smaller form factor connectors. Current capabilities and data capabilities are increase as compared to other USB types.

In some examples, hub 100 can include USB type-C ports 102-1 and 102-2. USB type-C port 102-1 and/or USB type-C port 102-2 can deliver power and communication data to the plurality of ports of hub 100. For instance, hub 100 can deliver power and communication data to RJ port 106, retail ports 110 and 112, direct current (DC) port, serial port 114, USB 2.0 ports 116, local area network (LAN) port 118, and audio port 120. In some examples, retail ports 112 can include a display port (DP) and/or hub 100 can include a separate DP port.

DC port 104 can be a DC-in port, and hub 100 can be powered via DC port 104 in some instances. For example, hub 100 can include a power source (not illustrated in FIG. 1) that can be an external or internal power source that can supply power to hub 100.

RJ port 106 can be a retail I/O port. RJ port 106 in some examples can be an RJ12 port, and can be used to power a retail cash drawer. For example, RJ port 106 can be an RJ12 retail cash drawer port. A retail cash drawer can be fitted with an RJ12 interface to communicate with desired point of service (POS) hardware and software.

Hub 100 can include other retail ports including, for instance, a 24 volt (V) power USB port 110 and a 12V power USB port 112. The 24V power USB port 110 can be retail-specific and can, for example, power a printer. The 12V power USB port 112 can be used, for instance, to power retail devices including a display, scanner, weight scale, monitor, touch screen, etc.

Hub 100 can include a USB-to-Serial powered port 114, which in some examples can include a USB-to-Serial powered 24V/12V/5V port. This port can be a retail port, for instance. Port 114 can be used with or without power. Power options can be selectable, and in some examples can include 24V/12V/5V/0V options. Port 114, in some examples can be used to reduce the use of a separate power adapter in a retail environment. Retail peripherals that may be accessed via port 114 include a weigh scale, a pin pad, a modem, a pole display, a printer, and a scanner, among others.

In some examples, hub 100 can utilize USB type-C power delivery technology to convert power at hub 100 to be able to power retail-specific devices via ports 106, 110, 112, and 114 regardless of the port type. For instance, a voltage regulator integrated circuit can receive a USB type-C power allowance and distribute the power delivery to support power (e.g., 24V/12V/5V) usage for retail devices.

USB 2.0 ports 116 can be used to power USB type connector devices, both retail specific and non-retail specific. While USB 2.0 ports are illustrated in FIG. 1, other USB type ports can be included in hub 100, including, for instance, USB 3.0 ports. USB 2.0 ports 116 can be used to power mice, printers, and/or other accessories, for example.

LAN port 118, also known as an Ethernet port, network connection, or network port, allows for connection to a network using a wired connection. In some examples, this is an RJ45 port. Audio port 120 can connect to a device's sound hardware including speakers, microphones, and headsets, among others. Audio port 120 can be located on a side of hub 100, in some instances.

In some examples, hub 100 can support data communication at a USB 3.1 speed. For instance, by utilizing USB type-C and USB PD technology, the retail-specific ports, including ports 106, 110, 112, and 114, can support data communication at a USB 3.1 speed, which increases associated data signaling rates as compared to other retail hub approaches.

Figure 2:
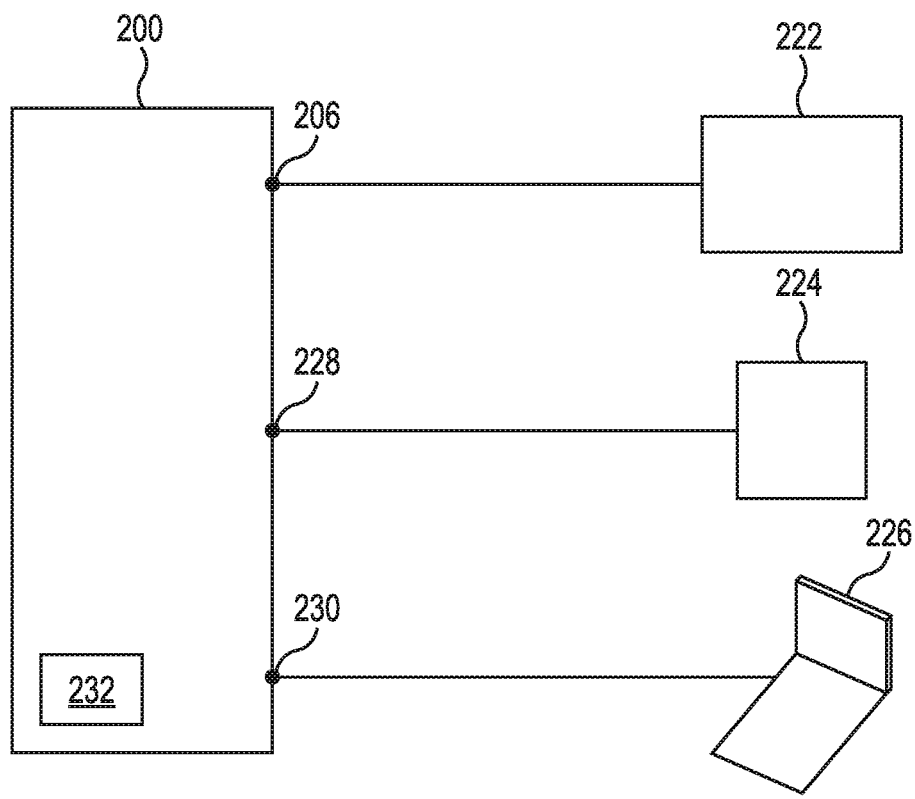
FIG. 2 illustrates a hub in communication with a plurality of devices.

FIG. 2 illustrates a hub 200 in communication with a plurality of devices 222, 224, and 226. While three devices are illustrated in FIG. 2, more or fewer devices can be connected to hub 200. In an example, hub 200 can be powered by computing device 226. Computing device can include, for instance, a notebook computing device, a tablet computing device, and/or a laptop computing device, among others. In such an example, hub 200 can have enough power to power a plurality of retail devices, such as tablet 224 and cash drawer 222, while still powering other devices connected to hub 200. Cash drawer 222 can be connected to hub 200 via an RJ12 port 206, while devices 224 and 226 can be connected to hub 200 via ports 228 and 230, respectively, which can include USB type or other port types.

In some examples, hub 200 can be powered without a separate power supply powered to supply power to hub 200. For instance, using USB-PD technology, hub 200 can utilize a power source from a computing device 226 from a battery (e.g., within a notebook computing device) or with a computing device with a direct AC source. The power can be re-directed to the plurality of device 222, 224, etc.

In another example, hub 200 can include a built-in voltage regulator integrated circuit 232 to support a power supply to hub 200 for powering computing device 226 and charging a battery of computing device 226. For instance, voltage regulator integrated circuit 232 can take in USB type-C power and distribute the power delivery to support power (e.g., 24V/12V/5V) usage for the plurality of devices 222, 224, and 226. A power supply can include, for instance, a power brick, power adaptor, or other power source. In some examples, the power supply can covert power, for instance from alternating current (AC) power to DC power.

In addition, this can allow for moving beyond a 100 Watt USB-PD limitation. For instance, USB-PD can provide up to 100 Watts of power at 20 V, but in some examples of the present disclosure, hub 200 can incorporate voltage regulator integrated circuit 232 to support an AC power adapter above 150 Watts. Power can be dissipated among the hub 200 to ports in need. In some examples, this can mitigate the limitation of industry USB-PD technology of 100 Watt power cap. For instance, at 100 Watts, it may be enough power to operate a standard POS terminal off of hub 200; however, it may not have enough power to carry full support of particular retail I/O stress/capacity levels. For instance, pulling two touch screen panels using a 12V powered USB port (estimated 30 Watts), while printing a 2-foot long receipt paper off of a 24V powered USB port (estimated 55 Watts), and powering a target personal computing device/12V pole display/scanner/scale/24V cash drawer would surpass the 100 Watt limitation.

In some instances, a hub can be controlled by a controller including a processing resource, a memory resource, and a number of engines. For example, the controller can be a combination of hardware and instructions for controlling the hub. The hardware, for example can include a processing resource and/or a memory resource (e.g., machine-readable memory (MRM), computer-readable memory (CRM), data store, etc.). For instance, the controller can be used for conversion of power at hub 100, 200, as described in FIGS. 1 and 2.

The processing resource, as used herein, can include a number of processors capable of executing instructions stored by a memory resource. The instructions (e.g., machine readable instructions (MRI)) can include instructions stored on the memory resource and executable by the processing resource to implement a desired function (e.g., controlling a hub).

The memory resource, as used herein, can include a number of memory components capable of storing non-transitory instructions that can be executed by processing resource. In some instances, the memory resource can be a non-transitory CRM or MRM. Memory resource can be integrated in a single device or distributed across multiple devices. Further, memory resource can be fully or partially integrated in the same device as processing resource or it can be separate but accessible to that device and processing resource. Thus, it is noted that the controller can be implemented on an electronic device and/or a collection of electronic devices, among other possibilities.

The memory resource can be in communication with the processing resource via a communication link (e.g., path). The communication link can be local or remote to an electronic device associated with the processing resource. The memory resource includes a number of engines. Examples of a local communication link can include an electronic bus internal to a machine (e.g., a computing system) where the memory resource is one of volatile, non-volatile, fixed, and/or removable storage medium in communication with the processing resource via the electronic bus.

The number of engines can include a combination of hardware and instructions to perform a number of functions described herein (e.g., hub control). The instructions (e.g., software, firmware, etc.) can be downloaded and stored in a memory resource (e.g., MRM) as well as a hard-wired program (e.g., logic), among other possibilities. In some instance, each of the number of engines can include instructions that when executed by a processing resource can function as a corresponding module. A module can include MRI that when executed by the processing resource can perform a number of functions including those described herein.

Figure 3:
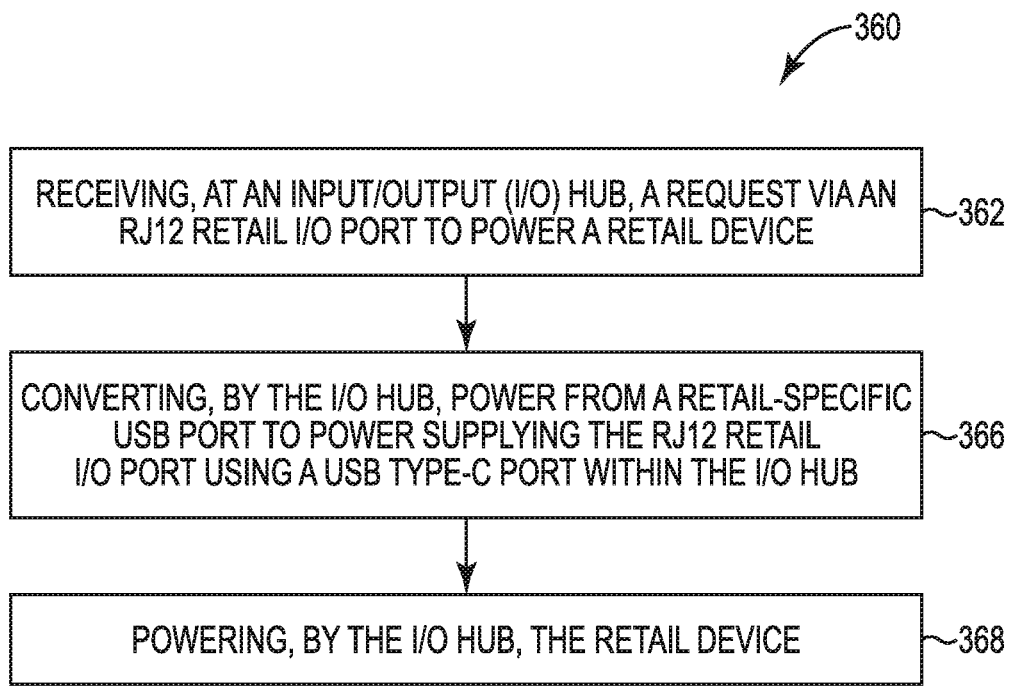
FIG. 3 illustrates a diagram of a method for powering a retail device according to an example.

FIG. 3 illustrates a diagram of a method 360 for powering a retail device according to an example. The retail device can include, for instance, a retail cash drawer. At 362, method 360 can include receiving, at an I/O hub, a request via an RJ12 retail I/O port to power a retail device. For example, method 360 can include receiving, at an I/O hub, a request via an RJ12 retail I/O port to power a retail cash drawer device.

For instance, the retail device may be plugged into the I/O hub via the RJ12 retail I/O port, and the retail device may be sensed by the I/O hub or the RJ12 retail I/O port. In another example, the retail device may already be connected to the I/O hub, for instance via an RJ12 port, and the retail device can be sensed by the I/O hub or the RJ12 retail I/O port in response to the retail device being powered on. Other manners of receiving a request can be utilized in some examples.

In some examples, hub 100 can near-continuously provide power, for instance low power, to RJ port 106. Low power, as used herein can be approximately 5V. As used herein, "near-continuously" can include providing power without meaningful breaks, and "approximately" can include a power within a particular margin, range, and/or threshold. RJ port 106 can include logic to detect a grounding of a chassis of a retail device, such as a cash drawer, upon insertion and/or connection to the RJ port. The retail device can include logic to detect calls from an operating system and allow a pulse, such as a 24V pulse, to pass through to charge a solenoid to open the retail device. In some examples, a 24V pulse may not be allowed to pass through if hub 100 does not detect an existence of the retail device.

At 366, method 360 can include converting, by the I/O hub, power from a retail-specific USB port to power supplying the RJ12 retail I/O port using a USB type-C port within the I/O hub. For example, the power can be converted from a retail-specific 24V USB port to power supplying the RJ12 retail I/O port using a voltage regulator integrated circuit.

Method 360 can include, at 368, powering, by the I/O hub, the retail device. For example, a USB type-C port can deliver power and communication data to an RJ12 I/O port, and an RJ12 retail cash drawer can be powered by the I/O hub via the RJ12 I/O port.

In some examples, method 360 can include receiving, at the I/O hub, a request to power the hub via a computing device. The method can include powering a computing device via the I/O hub and charging a battery of the computing device via the I/O hub. In such an example, the retail device can be powered via the I/O hub simultaneously to the powering of the computing device and a plurality of other retail- and non-retail-specific devices.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. An input/output (I/O) hub, comprising:
a registered jack (RJ) 12 I/O retail port;
a direct current (DC) port to receive power from a power supply of a computing device to power the I/O hub;
a display (DP) port;
a Universal Serial Bus (USB) type-C port to receive power to power the I/O hub and to deliver power and communication data to the RJ12 I/O retail port and the display port;
a voltage regulator integrated circuit to support an alternating current (AC) power adaptor above 150 Watts of power, and
wherein the I/O hub is without power supply.

2. The hub of claim 1, wherein the RJ12 I/O retail port is a RJ12 retail cash drawer port.

3. The hub of claim 1, further comprising:
a 24 volt power USB port
a 12 volt power USB port; and
the USB type-C port to deliver power and communication data to the 24 volt power USB port and the 12 volt power USB port.

4. The hub of claim 1, wherein the hub is a retail point-of-service (POS) hub.

5. A system, comprising:
a computing device having a power supply; and
a retail input/output (I/O) hub comprising:
a registered jack (RJ) retail cash drawer port;
a 24 volt powered USB (PUSB) port
a 12 volt powered PUSB port;
a USB-to-Serial powered port;
a display (DP) port;
a direct current (DC) port to receive power from the power supply of the computing device to power the I/O hub;
a Universal Serial Bus (USB) type-C port to receive power to power the I/O hub and to deliver power and communication data to the RJ retail cash drawer port, the 24 volt PUSB port, the 12 volt PUSB port, the USB-to-Serial powered port, and the display (DP) port; and
a voltage regulator integrated circuit to support an alternating current (AC) power adaptor above 150 Watts of power, and
wherein the retail I/O hub does not include a power supply.

6. The system of claim 5, wherein the USB-to-Serial powered port is a USB-to-Serial powered 24 volt/12 volt/5 volt port.

7. The system of claim 5, further comprising a 12 volt monitor DC port.

8. The system of claim 5, wherein the hub supports data communication at a USB 3.1 speed.

9. A method, comprising:
receiving, at an input/output (I/O) hub including a display port (DP), a request via a registered jack 12 (RJ12) retail I/O port to power a plurality of retail devices, wherein the I/O hub does not include a power supply;
redirect power from a power source in a computing device to power the I/O hub;
receiving alternating current at a voltage regulator integrated circuit above 150 Watts;
converting, by the I/O hub, power from the voltage regulator integrated circuit to power supplying the RJ12 retail I/O port and the display port (DP) using a USB type-C port within the I/O hub; and
powering, by the I/O hub, the plurality of retail devices at a combined wattage above 150 Watts.

10. The method of claim 9, further comprising converting the power from a retail specific 24 volt USB port to power supplying the RJ12 retail I/O port.

11. The method of claim 9, further comprising receiving, at the I/O hub, a request to power the hub via a computing device.

12. The method of claim 9, further comprising:
powering a computing device via the I/O hub; and
charging a battery of the computing device via the I/O hub.

13. The hub of claim 1, wherein the voltage regulator integrated circuitry is to further support the AC power adaptor to power a plurality of devices at a combined wattage above 150 Watts.

14. The method of claim 9, wherein the computing device is a notebook computing device, a tablet computing device, or a laptop computing device.

\* \* \* \* \*